Sept. 30, 1947.    G. H. MILLER    2,428,120
RECOVERY OF FURFURAL FROM FURFURAL-POLYMER MIXTURES
Filed May 25, 1945
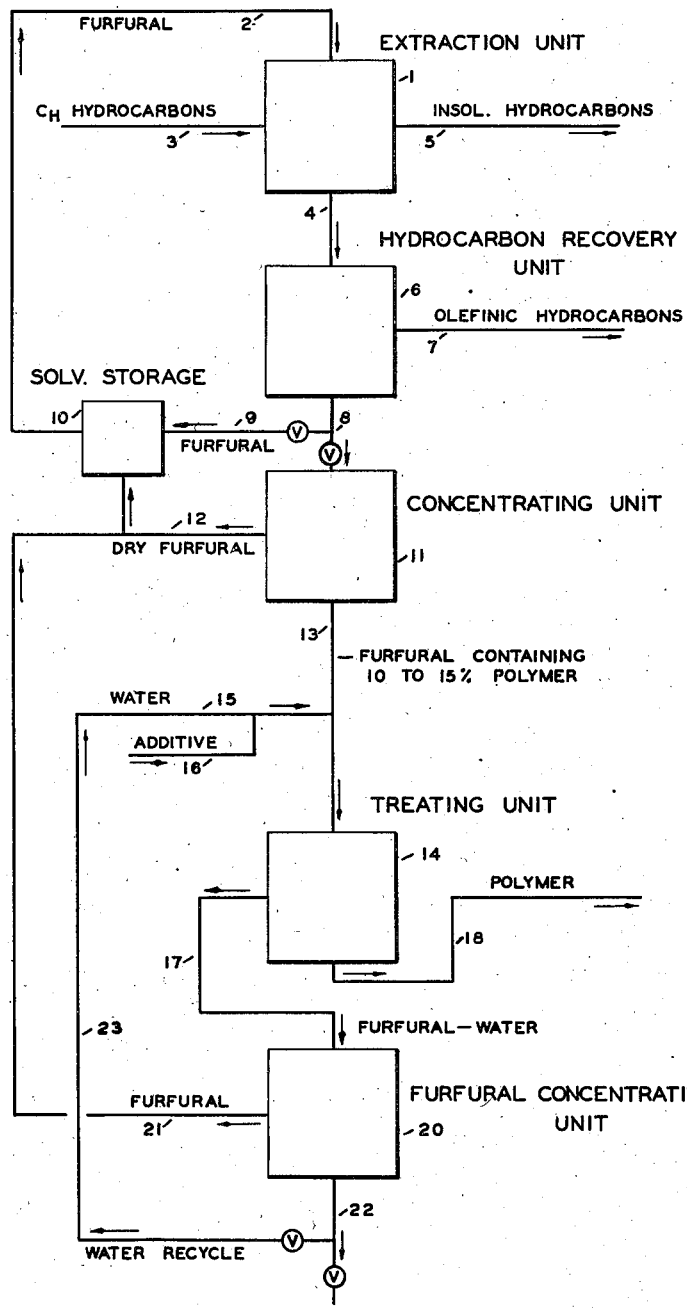
GORDON H. MILLER
INVENTOR
BY HIS ATTORNEY Patented Sept. 30, 1947

2,428,120

UNITED STATES PATENT OFFICE 2,428,120

RECOVERY OF FURFURAL FROM FURFURAL-POLYMER MIXTURES

Gordon H. Miller, Port Arthur, Tex., assignor to The Texas Company, New York, N. Y., a corporation of Delaware Application May 25, 1945, Serial No. 595,736

2 Claims. (Cl. 260—347)

This invention relates to the recovery of furfural from mixtures of furfural and polymer such as produced in the extraction and extractive distillation of hydrocarbon mixtures containing olefins and di-olefins with furfural.

The invention has to do with the recovery of furfural used in the extraction of olefin containing mixtures wherein the furfural containing dissolved hydrocarbons is subjected to distillation to effect separation between furfural and extracted hydrocarbons, and furfural contaminated with polymer material is treated with water in the presence of a surface-active agent under conditions such as to effect separation between furfural and the aforesaid polymer material.

Furfural is a useful solvent for effecting fractional separation between olefinic and paraffin hydrocarbons and also for effecting separation between olefins differing in degree of unsaturation. Thus, it may be used for effecting separation between mono-olefins and di-olefins.

It has been found that when furfural is used to extract unsaturates such as butadiene from hydrocarbon mixtures the furfural becomes contaminated during continued use with a small but appreciable amount of polymer or resin material. The mechanism of this polymer formation is not entirely clear. It may be that furfural under the conditions employed during the extractive treatment or during its recovery from the hydrocarbons undergoes polymerization to a small extent, or may enter into reaction with olefinic hydrocarbons forming polymer material, or both of these reactions may take place. Also, the unsaturated hydrocarbons may undergo polymerization in the presence of the furfural.

The presence of this polymer material in the mixture of hydrocarbons and furfural is objectionable because it forms deposits within the plant apparatus and particularly the distillation, heat exchange and other apparatus used for recovering the furfural. It tends to stick to the metal surfaces and as a result during continued exposure to elevated temperatures is converted into solid carbonaceous form. The deposition of this material upon the surfaces of the heat exchangers interferes with their efficient operation and in addition results in the necessity for frequent cleaning of the apparatus. This deposition may be so serious as to cause a shutdown of the plant.

In accordance with the invention wherein it is desired to extract butadiene from a $C_4$ hydrocarbon mixture by extraction or extractive distillation, the hydrocarbon mixture is subjected to contact with furfural at temperatures in the range of about 140 to 340° F. so as to produce an extract phase comprising furfural and dissolved butadiene. This extract phase is separately subjected to distillation, advantageously in the absence of steam, so as to strip the hydrocarbons from the solvent at temperatures in the range about 280 to 340° F. The unvaporized liquid comprises furfural and a small amount of polymer liquid higher boiling than the furfural, and ranging in amount from a fraction of a per cent to 1 or 2 per cent by weight of the liquid.

This liquid mixture of furfural containing polymer in relatively small proportion is separately subjected to distillation in the absence of steam to remove the bulk of the furfural in substantially dry form, leaving a residual fraction comprising furfural and polymer in which the polymer amounts to 10 to 15% by volume, more or less. Thus, it may contain as much as 50% polymer.

This residual fraction is then treated with a substantial quantity of water under conditions effective to dissolve substantially all of the residual furfural. The aqueous mixture is subjected to settling with gentle agitation in the presence of a small amount of a surface-active agent so that the insoluble polymer material coagulates in a free settling form. The settled polymer is removed from the clear supernatant liquid consisting of furfural dissolved in water. The supernatant liquid is drawn off and subjected to distillation so as to obtain the furfural in substantially dry form or containing only a small amount of water.

A feature of the invention thus involves effecting the foregoing settling in the presence of a small amount of a surface-active agent such as dioctyl ester of sodium sulfosuccinic acid. Additional examples of active agents will be given later. The agent is preferably incorporated in the water initially added to the polymer concentrate. The presence of the agent in the water materially facilitates effecting separation between polymer and furfural. Under ordinary conditions, this separation is difficult to make due to the peculiar nature of the polymer.

The surface-active agent not only facilitates this separation but also reduces the tendency of the polymer material to adhere to the metal surfaces of the treating apparatus and thus facilitates removal of the polymer from the treating zone.

It has been found that gentle stirring is essential. If the stirring is too violent during liberation of the polymer, it separates into a finelydivided form which is difficult to separate by settling.

The recovered polymer can be used in the manufacture of plastics.

In actual plant operation, the proportion of this residual fraction or polymer concentrate to the total furfural employed in the system may be relatively small. Therefore, only a portion of the recovered solvent may be subjected to the foregoing water extraction step. Thus, 1 or 2% of the total furfural in the system may be continuously withdrawn from the recovery system in the form of this polymer concentrate and this withdrawn concentrate is subjected to the water extraction to remove furfural in pure form or substantially pure form. The purified furfural is continuously returned to the system. In this way the accumulation of polymer material in the total solvent is prevented from exceeding a predetermined limit.

For a more detailed description of the invention, reference will now be made to the accompanying drawing wherein the various stages of the process are indicated in a diagrammatic form.

In the drawing, the numeral 1 refers to an extractive distillation unit which may comprise one or more stages and wherein the $C_4$ hydrocarbon mixture is extracted with furfural. The furfural may be introduced from a source, not shown, through a conduit 2, while the $C_4$ hydrocarbon feed is introduced from a source, not shown, through a conduit 3.

The $C_4$ hydrocarbon feed may comprise a mixture of paraffins, mono-olefins, and di-olefins, although it may comprise either a mixture of olefins and paraffins or a mixture of olefins and di-olefins.

The extraction of butadiene from the normally gaseous mixture containing it is usually carried out at temperatures ranging from about 140° F. at the top of the tower to about 280 to 340° F. at the bottom. As a result, there is obtained a solution of butadiene in furfural which is removed through a conduit 4. The insoluble hydrocarbons remaining from the extractive treatment are discharged through a conduit 5.

The solution of furfural and hydrocarbons passing through the conduit is introduced to a hydrocarbon recovery unit 6 which also may involve one or more stages. The dissolved hydrocarbons are stripped from the furfural in the absence of steam at a temperature ranging from about 280 to 340° F. It is desirable to avoid the use of steam in the distillation so as to maintain the water content of the furfural not in excess of about 4% by volume. Furfural containing this small amount of water is effective as a solvent in the extractive treatment of the $C_4$ hydrocarbon feed.

The separated olefins are discharged through a conduit 7 while the furfural from which they have been separated is conducted through a conduit 8, the bulk of the furfural being passed through a pipe 9 to a storage tank 10, while the remainder is passed to a concentrating unit 11. The furfural passing through pipe 8 is contaminated with a small amount of polymer material. For example, it may comprise about 95.6% furfural, 3% water, and 1.4% polymer by weight. About 1 to 2% of the total solvent removed through pipe 8 is passed to the unit 11, or an amount sufficient to avoid buildup of polymer in the solvent system.

In the unit 11, the furfural is subjected to distillation in the absence of steam so as to remove the bulk of the furfural in substantially dry form which is discharged through a conduit 12. The residual fraction comprises furfural containing about 10 to 15% polymer and may be designated as a polymer concentrate. It is removed through a conduit 13.

This residual fraction is conducted to a treating unit 14 wherein it is commingled with water at a temperature of about 100° F. or in the range about 70 to 120° F. The water is mixed with the polymer concentrate in the proportion of about 10 volumes or in the range from about 8 to 12 volumes of water per volume of concentrate. The proportions of water and the temperature employed are such as to effect complete or substantially complete solution of the furfural in the water.

Advantageously, the surface active agent is incorporated in the water passing to the unit 14. Thus, the water is drawn from a source, not shown, through a conduit 15, while the agent material is likewise drawn from a source, not shown, through a conduit 16 which communicates with conduit 15. The mixture of water and additive may be injected into conduit 13 or may be passed directly to unit 14.

In unit 14 provision is made for effective contact of the water and additive with the polymer concentrate followed by settling wherein phase separation occurs at about the aforesaid temperature in the range 70 to 120° F. advantageously while being subjected to gentle stirring. The polymer material settles as a heavier layer while the furfural dissolved in water separates as a lighter layer which latter is discharged through a conduit 17, the polymer being removed through conduit 18.

The furfural solution is conducted to a concentrating unit 20 wherein it is subjected to stripping and fractional distillation in one or more stages by conventional means in order to remove the water from the furfural, the furfural being discharged through conduit 21. This discharged furfural may contain a small amount of water such that when returned to the solvent storage the water content of the total solvent in the extraction portion of the system is maintained at about 4% by volume.

The water removed in the distillation step may be discharged through a conduit 22 and recycled, all or in part, through conduit 23 for use in the unit 14.

The surface active agent is added to the water used in the unit 14 in an amount ranging from about 0.05 to 2.0% by weight of the water. Thus, it is advantageous to employ a water soluble or water miscible agent. The agent is one which reduces the surface tension of water and reduces the interfacial tension between polymer and water. It should have at least the surface active properties of sodium naphthenate or a material such as that previously mentioned.

Surface active agents suitable for this purpose comprise wetting agents, examples of which include alkali metal salts of sulfonic acids; sodium soap of tall oil; alkali metal salts of acid sulfuric esters of high molecular weight alcohols, such as lauryl sodium sulfate; alkyl esters of sodium sulfosuccinic acid, such as the dihexyl ester, the diamyl ester, or the dibutyl ester of sodium sulfosuccinic acid; and alkyl aryl sulfonates, etc. Compounds offered to the trade, such as Nacconol NR, Aerosol MA, Aerosol AY, Aerosol IB, Aerosol OS, Dreft, Drene and Gardinol, may be used.

It is also contemplated that the treatment of the polymer concentrate with water may be effected in a tower employing concurrent flow of polymer concentrate and water containing the additive.

In connection with the foregoing diagram, specific mention has been made of using furfural to extract butadiene from $C_4$ hydrocarbon mixtures. However, it is contemplated that the invention has application to the recovery of furfural from furfural-polymer mixtures resulting in the furfural extraction of other olefinic hydrocarbons or oily materials, as a result of which extraction the furfural becomes contaminated with polymer material.

The invention is thought to have application in the recovery of other solvents of the Furan type, such as furfuryl alcohol and tetrahydrofurfuryl alcohol. Therefore, the term "furfural" in the appended claims is used in a comprehensive sense to include furfural and its related compounds.

Obviously many modifications and variations of the invention as above set forth may be made without departing from the spirit and scope thereof, and therefore only such limitations should be imposed as are indicated in the appended claims.

I claim:

1. The method of recovering furfural from a mixture of furfural and polymer which comprises passing to a treating zone a furfural feed containing a substantial amount of polymer formed during contact between furfural and olefinic hydrocarbons at elevated temperatures, subjecting the furfural-polymer mixture therein to contact with a relatively large proportion of water in the presence of a small amount of a water soluble wetting agent effective to coagulate said polymer in free settling form, forming an aqueous phase comprising furfural dissolved in water and an insoluble phase comprising polymer, and separating said phases.

2. The method of recovering furfural from a mixture of furfural and polymer which comprises passing to a treating zone a furfural feed containing a substantial amount of polymer formed during contact between furfural and olefinic hydrocarbons at elevated temperatures, subjecting the furfural-polymer mixture therein to contact with a relatively large proportion of water in the presence of a small amount of a water soluble wetting agent selected from the class consisting of organic alkali metal sulfates and sulfonates effective to coagulate said polymer in free settling form, forming an aqueous phase comprising furfural dissolved in water and an insoluble phase comprising polymer, and separating said phases.

GORDON H. MILLER.

REFERENCES CITED

The following references are of record in the file of this patent:

UNITED STATES PATENTS

| Number | Name | Date |
|---|---|---|
| 2,372,668 | Hachmuth | Apr. 3, 1945 |
| 2,372,623 | Zinner | Mar. 27, 1945 |
| 1,980,118 | Tyler | Nov. 6, 1934 |